United States Patent [19]

Kubach et al.

[11] Patent Number: 4,585,176

[45] Date of Patent: Apr. 29, 1986

[54] ELECTROMAGNETICALLY ACTUATABLE VALVE

[75] Inventors: Hans Kubach, Korntal-Münchingen; Asta Hascher-Reichl, Stuttgart, both of Fed. Rep. of Germany

[73] Assignee: Robert Bosch GmbH, Stuttgart, Fed. Rep. of Germany

[21] Appl. No.: 631,040

[22] Filed: Jul. 16, 1984

[30] Foreign Application Priority Data

Oct. 4, 1983 [DE] Fed. Rep. of Germany ....... 3336010

[51] Int. Cl.[4] .......................... B05B 1/30; F16K 31/02

[52] U.S. Cl. ................................ 239/585; 251/129.14; 251/129.17

[58] Field of Search ................ 239/585; 251/141, 129, 251/129.14, 129.17; 137/DIG. 2

[56] References Cited

U.S. PATENT DOCUMENTS

| | | | |
|---|---|---|---|
| 3,628,767 | 12/1971 | Lombard | 251/141 X |
| 3,630,482 | 12/1971 | Beller | 251/129 X |
| 3,731,880 | 5/1973 | Williams | 239/585 |
| 3,757,263 | 9/1973 | Saarem et al. | 251/129 X |
| 4,423,843 | 1/1984 | Palma | 251/129 X |
| 4,455,982 | 6/1984 | Hafner et al. | 239/585 X |
| 4,531,679 | 7/1985 | Pagdin | 239/585 |

FOREIGN PATENT DOCUMENTS

| | | | |
|---|---|---|---|
| 7724 | 2/1980 | European Pat. Off. | 239/585 |
| 2541033 | 3/1977 | Fed. Rep. of Germany | 251/141 |

*Primary Examiner*—Andres Kashnikow
*Assistant Examiner*—David P. Davidson
*Attorney, Agent, or Firm*—Edwin E. Greigg

[57] ABSTRACT

An electromagnetically actuatable valve is proposed, which serves in particular as a fuel injection valve for fuel injection systems of internal combustion engines. The valve includes pole pieces supported in a valve housing, which are joined by a yoke on which a magnetic coil is disposed. Remote from the yoke, the first pole piece has a first pole and the second pole piece has a second pole, the pole pieces are arranged to extend toward one another and define therebetween a gap in which a nonmagnetic stop may be disposed. The pole pieces have a continuously extending, concave surface which confront a ball which serves as both the armature and the movable valve element. The ball is urged toward a valve seat by a guide diaphragm supportedly attached to the housing at its circumference.

8 Claims, 2 Drawing Figures

ELECTROMAGNETICALLY ACTUATABLE VALVE

BACKGROUND OF THE INVENTION

The invention is based on an electromagnetically actuatable valve and more particularly a fuel injection valve for fuel injection systems of internal combustion engines. An electromagnetically actuatable valve of this general kind which is already known is structurally very large and its magnetic circuit is expensive in its design; also, the valve can be miniaturized only to a limited extent.

OBJECT AND SUMMARY OF THE INVENTION

The electromagnetically actuatable valve according to the invention has the advantage over the prior art that it can be made very small in structure and triggered very accurately, and that it has a long operational life.

A particularly advantageous feature of the invention is the embodiment of the armature in the form of a ball, which, as the movable valve member, simultaneously cooperates with a fixed valve seat. It is also advantageous for the ball-shaped armature to be guided by a guide diaphragm attached to the housing at its circumference and to be urged in the direction toward the valve seat.

It is likewise advantageous for the magnetic coil to be provided with a plastic extrusion coating, which on the other end is embodied as a connection fitting and serves to carry fluid.

The invention will be better understood and further objects and advantages thereof will become more apparent from the ensuing detailed description of a preferred embodiment taken in conjunction with the drawing.

DESCRIPTION OF THE PREFERRED EMBODIMENT

Figure 1:
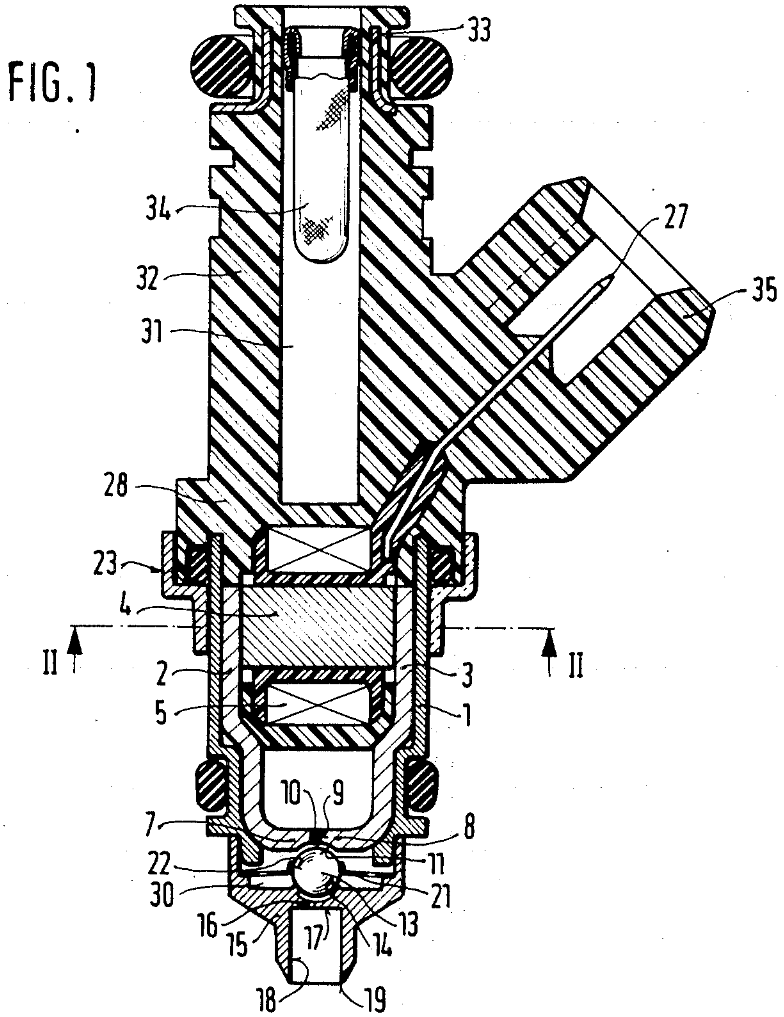
FIG. 1, in simplified form, shows a fuel injection valve embodied in accordance with the invention.
Figure 2:
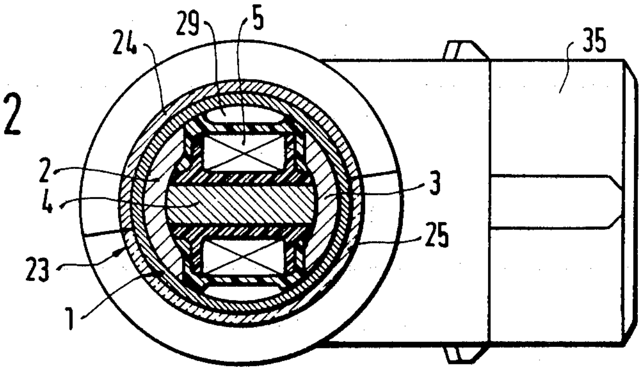
FIG. 2 is a section taken along the line II—II of FIG. 1.

The fuel injection valve for a fuel injection system which is shown in FIGS. 1 and 2 as an example of a valve serves by way of example to inject fuel into the intake tube of mixture-compressing internal combustion engines with externally supplied ignition. A valve housing 1 has inserted into it a first pole piece 2, and a second pole piece 3, each being disposed on different ends of a yoke 4 which carries a magnetic coil 5. On its end remote from the yoke 4, the first pole piece 2 has a first pole 7, while the second pole piece 3 has a second pole 8 on its end remote from the yoke 4. The first pole 7 and the second pole 8 extend transversely to the longitudinal axis of the valve housing, pointing toward one another, and between them they define a gap 9 in which a stop body 10 fabricated of non-magnetic material may be disposed. On their ends remote from the yoke 4, the poles 7, 8 are provided with a concave surface 11 extending over both poles 7, 8. The stop body 10 may protrude slightly, for example by approximately 0.1 mm, out of the concave surface 11. Serving as the armature and simultaneously as the movable valve member of the valve is a ball 13, which is disposed, with an amount of play corresponding to the partial valve stroke, between the concave surface 11 of the poles 7, 8 and a fixed valve seat 14. The valve seat 14 is embodied in a nozzle body 15 joined to the valve housing 1. Downstream of the valve seat 14, at least one fuel guide bore 16 serving to meter fuel is provided in the nozzle body 15, preferably discharging in such a manner at the bottom 17 of a preparation bore 18 embodied in the nozzle body 15 that no inflow directed at a tangent into the preparation bore 18 can occur; instead, the fuel stream at first emerges from each fuel guide bore 16 without touching the wall and then strikes against the wall of the preparation bore 18, where it flows toward the lip of the open end 19, distributing itself over the wall as a film in the approximate shape of a parabola, and then tears off from the lip. A guide diaphragm 21 is supportedly attached to the housing at its circumference on the nozzle body 15 between the poles 7, 8 and the valve seat 14 and with a central guide opening 22 it is arranged to grip the circumference of the ball 13 such that by means of the guide diaphragm 21, a force is exerted upon the ball 13 in the direction of the valve seat 14. The ball 13 is simultaneously guided in the radial direction by the guide diaphragm 21. The stroke of the ball 13 serving as the movable valve member can be shortened by deforming the nozzle body 15 in the direction toward the poles 7, 8.

In the vicinity of the pole pieces 2, 3, the valve housing 1 is surrounded by a short-circuit ring 23, which as FIG. 2 shows in clearer detail is rotatably supported about the valve housing 1 and comprises two ring parts 24, 25 assembled in one plane parallel to the longitudinal axis of the valve; one of the ring parts, part 24, is fabricated of ferromagnetic material, and the other ring part 25 is fabricated of nonmagnetic material. The dynamic balancing of the valve can be effected by rotating the short-circuit ring 23.

The magnetic coil 5 with its contact lugs 27 is sealingly surrounded by a plastic extrusion coating 28, between which coating 28 and the valve housing 1 at least one fluid flow conduit 29 is formed (see FIG. 2), extending in an axial direction. This conduit 29 leads on one end to the collecting chamber 30 formed between the poles 7, 8 and the valve seat 14 and on the other end communicates with a fluid inlet conduit 31, which is provided in the connection fitting 32 embodied outside the valve housing 1 by the plastic extrusion coating 28. On the end of the connection fitting 32 remote from the valve housing 1, a metal sheath 33 can be at least partially embedded in the plastic extrusion coating 28 for reinforcement purposes. In this area of the fluid inlet conduit, a filter 34 also can be inserted. The valve communicates via the fluid inlet conduit 31 with a fuel source, for instance a fuel distributor line, not shown, of a fuel injection system. The plastic extrusion coating 28 also, by encompassing the contact lugs 27, embodies a plug connection 35, by way of which the electrical triggering of the valve is effected by means of an electronic control unit, not shown.

If the magnetic coil 5 is now excited, that is, if it experiences the flow of electric current through it, then the result is a magnetic flux, for example via the first pole piece 2, embodied in the form of a segment of a tube, to the first pole and, by attracting the ball 13, to the second pole 8 and via the pole piece 3, which again is embodied as a segment of a tube, back to the yoke 4. The poles 7, 8 do not have the same polarity.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the U.S. is:

1. An electromagnetically actuatable valve for fuel injection systems of internal combustion engines, comprising a ferromagnetic core and a magnetic coil supported in a valve housing arranged to actuate an armature-valve member adapted to cooperate with a fixed valve seat, said armature-valve member further arranged to move away from said valve seat toward said core counter to the force of a restoring diaphragm when the magnetic coil is excited, said core further including:

a yoke which bears said magnetic coil, a first pole piece disposed on one end of said yoke, and a second pole piece disposed on the other end of said yoke, and further wherein said first pole piece has a first pole on its end remote from said yoke, and said second pole piece has a second pole on its end remote from said yoke;

and said first pole and said second pole are arranged to extend toward one another and define a gap therebetween, and said pole pieces being respectively provided with a concave area which extends equally over both said pole pieces and oriented toward the armature-valve member.

2. A valve as defined by claim 1, further wherein said armature-valve member is embodied as a ball-shaped means and simultaneously serves as a movable valve member.

3. A valve as defined by claim 2, further wherein said ball-shaped means is supported in an aperture in said diaphragm, said diaphragm having a circumference that is supported by said housing and said diaphragm further arranged to urge said ball-shaped means toward said valve seat.

4. A valve as defined by claim 1, further wherein said first and second poles are maintained in a spaced relation by a nonmagnetic stop means and said stop means depends from said concave area.

5. A valve as defined by claim 1, further wherein a rotably arranged short-circuit ring composed of two ring means disposed in a plane parallel to the longitudinal axis of said valve housing encircles said valve housing adjacent one end of said first and second pole pieces, one of said ring means comprising ferromagnetic material and said other ring means being nonmagnetic material.

6. A valve as defined by claim 1, further wherein said magnetic coil is encapsulated in plastic, at least one fluid flow conduit arranged to extend in an axial direction through said valve housing and along said encapsulated magnetic coil and a plastic connection fitting enclosing said magnetic coil.

7. A valve as defined by claim 6, further wherein a metal sheath is positioned in said plastic connection fitting remote from said valve housing.

8. A valve as defined by claim 7, further wherein said metal sheath is partially embedded in said plastic connection fitting.

* * * * *